United States Patent [19]

Makinson et al.

[11] 4,124,343
[45] Nov. 7, 1978

[54] INJECTION MOLDING DIVERS ARTICLES IN SELECTABLY ORDERED SEQUENCE

[75] Inventors: Charles L. Makinson, Akron; Kenneth C. Sutter, Uniontown; David Z. Tyson, Akron, all of Ohio

[73] Assignee: The Goodyear Tire & Rubber Company, Akron, Ohio

[21] Appl. No.: 714,885

[22] Filed: Aug. 16, 1976

[51] Int. Cl.² .................................................. B29F 1/00
[52] U.S. Cl. .................................. 425/145; 425/34 R; 425/258; 425/567; 425/574
[58] Field of Search ............... 425/247, 246, 248, 258, 425/DIG. 226, DIG. 227, 242 R, 135, 145, 574, 575, 576, 567, 34 R, 18, 20, 450.1; 164/339, 341, 303, 306, 312

[56] References Cited

U.S. PATENT DOCUMENTS

| | | | |
|---|---|---|---|
| 3,005,235 | 10/1961 | Patera | 425/246 |
| 3,134,137 | 5/1964 | Immel | 425/246 |
| 3,220,058 | 11/1965 | Ehrenfreund | 425/246 X |
| 3,309,737 | 3/1967 | MacMillan | 425/19 |
| 3,327,352 | 6/1967 | Osgood | 425/247 X |
| 3,448,490 | 6/1969 | DeRyck | 425/119 |
| 3,537,156 | 11/1970 | Glass | 425/258 X |
| 3,550,196 | 12/1970 | Gazuit | 425/34 R |
| 3,600,755 | 8/1971 | Cook | 425/246 X |
| 3,609,815 | 10/1971 | Rudolf et al. | 425/246 |
| 3,833,330 | 9/1974 | Aoki | 425/247 |
| 3,841,813 | 10/1974 | Stancia | 425/247 X |
| 3,947,196 | 3/1976 | Tribbett | 425/574 |
| 3,972,369 | 8/1976 | Carbonnel | 164/303 X |

FOREIGN PATENT DOCUMENTS

| | | | |
|---|---|---|---|
| 2,041,451 | 2/1971 | Fed. Rep. of Germany | 425/574 |
| 1,501,027 | 10/1967 | France | 425/247 |
| 802,014 | 9/1958 | United Kingdom | 425/38 |

Primary Examiner—Francis S. Husar
Assistant Examiner—William R. Briggs
Attorney, Agent, or Firm—R. S. Washburn

[57] ABSTRACT

An injector mounted on a carriage having an elevator is movable along a row of conventional mold press units each having an article mold, and is movable vertically to register with a selected mold. The press units and the molds therein are separate and independent of one another. Injection parameters are preset and activated upon registry of the injector with a selected mold, independently of the mold-to-mold sequence selected. Conventional mold press units (clamps) are simply modified to cooperate with the injector. The foregoing abstract is not to be taken as limiting the invention of this application, and in order to understand the full nature and extent of the technical disclosure of this application, reference must be made to the accompanying drawing and the following detailed description.

15 Claims, 8 Drawing Figures

INJECTION MOLDING DIVERS ARTICLES IN SELECTABLY ORDERED SEQUENCE

The present invention relates generally to injection molding of articles from elastomeric stock materials. In particular, the invention relates to injection molding a plurality of articles of differing dimensions in continuing selectably ordered sequence from a particular elastomeric stock material of which butyl neoprene is representative.

Although the invention is not limited to the production only of large articles, it is found particularly useful for large articles which have not heretofore been satisfactorily or economically produced by injection molding.

A principal aim of the present invention is to provide for the economical and continuous serial production of injection molded articles of diverse shapes and sizes subject only to being made of the same material.

Briefly and broadly, in one aspect the invention provides an apparatus for injection molding a plurality of diverse articles in any selected sequence, the apparatus comprising, a plurality of separate and individually free-standing mold press units having independently controlled cure-time cycles disposed in linear array, a track having spaced parallel rails extending adjacent to each of said mold press units, a carriage movable along said track, injection means supported on said carriage for movement to injection registry with a mold in any selected one of said press mold units from any other of said units.

In a further aspect, the invention provides an apparatus for injection molding articles of an injectable curable elastomeric compound, the apparatus including a plurality of independent free-standing mold press units and a single injection means selectively associable with individual ones of said mold press units, and characterized by lock means affixed individually on each of said mold press units and locking means on said injection means, said locking means being interengageable with said lock means of a selected mold press unit to resist forces tending to separate the injection means from the mold press unit during injection of said compound into the mold press unit and to isolate said forces from structures supporting the mold press unit.

To acquaint persons skilled in the arts most closely related to the present invention, certain preferred embodiments thereof illustrating the best mode now contemplated for putting the invention into practice are described herein by and with reference to the annexed drawings forming a part of this specification. The embodiments shown and described herein are illustrative and as will become apparent to those skilled in these arts, can be modified in numerous ways within the spirit and scope of the invention defined in the claims hereof.

Figure 1:
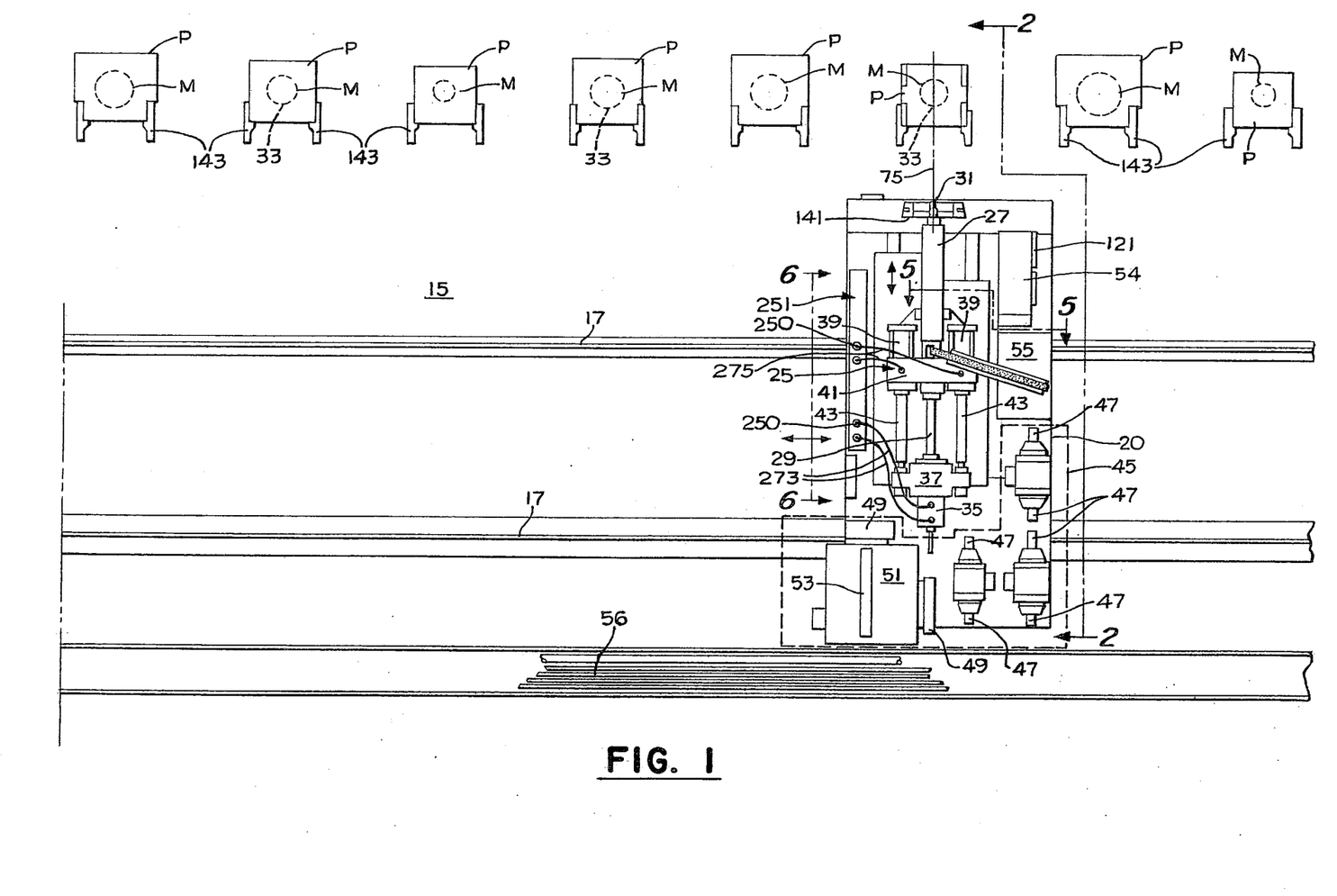
FIG. 1 is a schematic plan view of apparatus constructed and arranged in accordance with the invention.

A general arrangement of apparatus in accordance with the invention is illustrated in FIG. 1 and includes a plurality of independent separate free-standing mold press units P each of which is provided with modifications in accordance with the invention which will be discussed in more detail presently. Except for these modifications, the mold press units P are conventional and can be obtained from manufacturers such as McNeil and NRM, both of Akron, Ohio. Each mold press unit includes a mold M individually adapted to the article to be injection molded and cured therein. The mold press units are arranged in a linear array which can include from two to eight or more individual separate free-standing mold press units. These units are independent of each other and are installed on the manufacturing floor 15 in a conventional manner.

A notable concept of the apparatus is that of employing conventional press units (sometimes referred to as "clamps"), which can be existing press units requiring only the previously mentioned modifications. These are independent separate free-standing units without connection or other relation to one another.

A track extending adjacent to each mold press unit along the entire linear array is provided by a parallel pair of carriage rails 17 the tops of which are disposed at or nearly at floor level so as to minimize interference with traffic across the track.

Injection means for injection of extrudate into the mold of any selected mold press unit is mounted on a carriage 20 adapted to travel along the track so as to be aligned in injection registry with any selected mold press unit in any sequence along the line array. The injection means preferred is a conventional reciprocating screw injector 25 provided by the Egan Company of Summerville, N.J. The injector comprises a barrel 27 in which an injection screw is mounted for both rotation and reciprocation to deliver suitably prepared material by way of an injection nozzle 31 to a sprue 33 of the selected mold M and mold press unit P. The screw is rotated by a hydraulic motor 35 mounted on the yoke 37 and is reciprocated by the action of the pair of hydraulic cylinders 39 fixed on the extruder frame 41. The cylinder rams 43 are connected to the yoke such that actuation of the cylinders reciprocates the yoke and the screw with respect to the frame and the barrel.

A notable feature of the apparatus is the provision of a complete hydraulic power system 45 including a plurality of electric motor-driven hydraulic pumps 47, the necessary piping, hydraulic control valves 49, the oil reservoir 51 and heat exchanger 53, mounted on the carriage 20 for travel with the carriage and injector along the track. This arrangement provides the advantage of assuring delivery of undiminished hydraulic power to the injector at any location.

Injection control means to be described presently are accommodated in a control cabinet 54 mounted on the carriage. A panel 121 carries selector switches for manually preselecting control parameters for control of the injector with respect to any selected mold press unit.

Electric power is supplied to the carriage by way of cables supported in a conventional utility accommodation track 56 called "Power Track" ® supplied by Gleason Corp. of Brecksville, Ohio.

A large container 55 disposed on the carriage 20 provides continuous supply of material directly to the extruder-injector 25.

Figure 2:
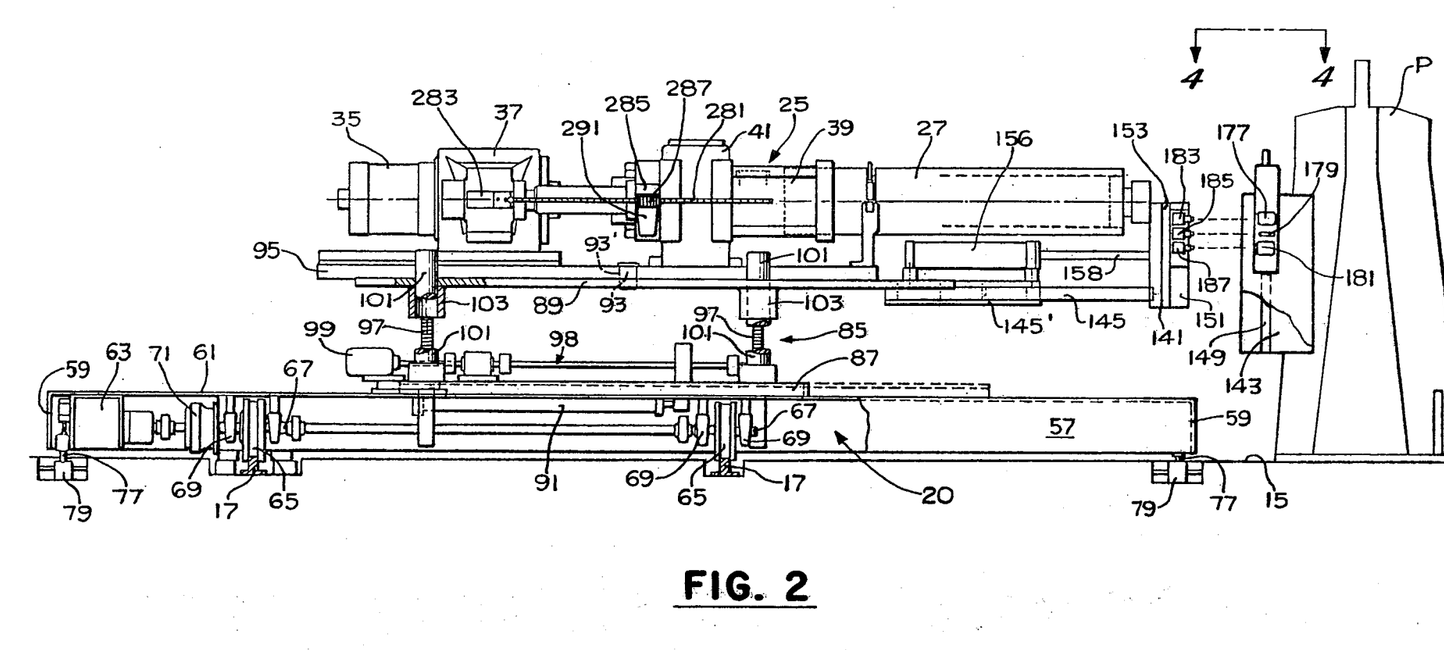
FIG. 2 is an elevation view of a portion of the apparatus of FIG. 1.

The apparatus of FIG. 1 is illustrated in elevation in FIG. 2. The carriage 20 comprises a rectangular box weldment having side plates 57, end plates 59, and a deck plate 61 suitably stiffened to support the loads imposed thereon.

The carriage 20 is traversed along the rails 17 by a hydraulic motor 63 connected by way of suitable control valves 49 to the power system 45. The motor is drivingly connected coaxially to the wheels 65 fixed on the axles 67 which rotate in bearings 69 fixed on the carriage. A hydraulicly actuated brake 71 is mounted coaxially of the wheels 65 and is operable to control the movement of the carriage.

To align the carriage 20 and particularly the injector nozzle 31 in a vertical plane 75 coincident with the vertical center plane of the mold sprue 33 in a selected mold press unit, the carriage 20 has a pair of tapered lock-pins 77 which can be extended, downwardly, to enter correspondingly tapered sockets 79 which are set in the floor in aligning relation with the respective mold press units. The pins 77 serve as alignment means and are interconnected with the brake 71 so that as the pins are deployed the brake 71 is released, enabling the cooperation of the tapers of the pin and the socket to move the carriage a small distance free of restraint by the brake and thus position the carriage in suitable alignment in the vertical plane 75.

To raise and lower the injector 25 and its nozzle 31 to match the elevation of the sprue 33, the apparatus includes elevator means provided by an elevator 85 having a slide base 87, a platform 89, and screw means for moving the platform relative to the slide base. The slide base 87 is mounted on the deck 61 of the carriage in slideways to move longitudinally toward and away from the selected mold press unit in a horizontal plane. A hydraulic cylinder 91 connected between the slide base 87 and the carriage 20 provides a first slide operating means by which the elevator 85 is moved toward or away from the mold press unit.

The injector 25 is mounted on the platform 89 for limited movement relative to a stud 93 fixed in the platform and extending upward loosely in a hole 93' in the base plate 95 of the injector. The arrangement facilitates minor corrective alignment of the injector relative to a mold press unit.

To raise the platform 89 relative to the slide base 87, the screw means includes four screw jacks 97 and jack drive means 98, which connect the screw jacks for equal vertical movement. Four guide pins 101 are fixed to and extend upwardly from the slide base. Four guide pin bushings 103 are fixed on the platform 89 to slide vertically along the pins, to maintain the vertical alignment of the platform with respect to the slide base 87. The motor 99 of the jack drive means is hydraulic and is supplied from the previously mentioned hydraulic power system 45 on the carriage.

One of the advantageous aspects of the apparatus will now be apparent. The injector can be moved to align the injection nozzle 31 with a selected mold press unit, the sprue 33 of which is located at any elevation, within the range of the elevator means. Thus, the particular molds installed in the individual mold press units not only can differ in size and shape of article to be produced but the sprue serving any particular mold can be located at the elevation in the mold most suited to the article, independent of the usual machine constraints.

Figure 3:
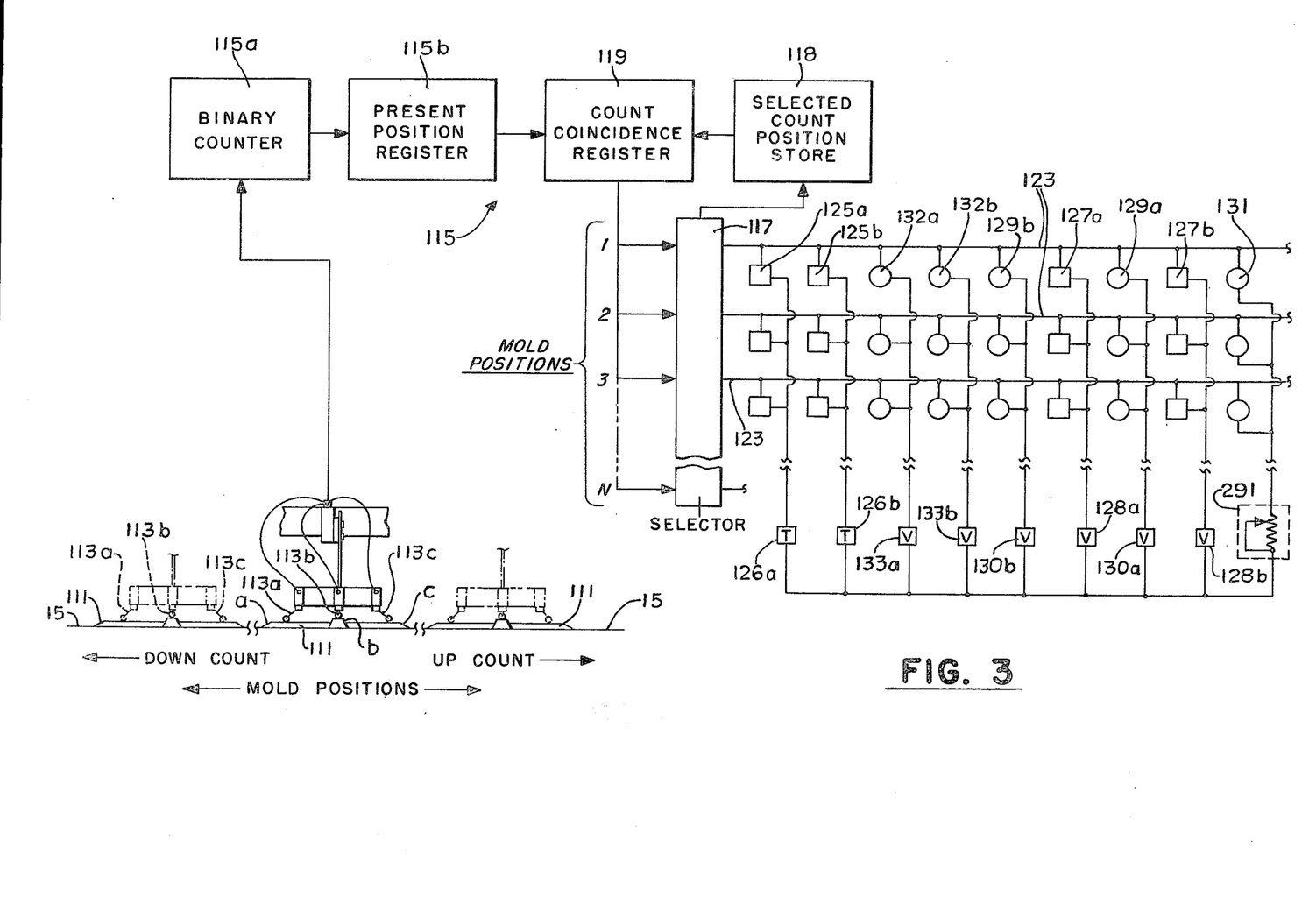
FIG. 3 is a schematic diagram of a part of the apparatus of FIGS. 1 and 2.

To control the movement of the carriage 20 from one to another of the mold press units, detector means is mounted on the carriage for cooperation with actuator means disposed in fixed relation respectively with each of the mold press units. Referring to FIG. 3, the actuator means is provided by a 3-part actuator 111 fixed on the operating floor 15 beneath the carriage so that the injector 25 is aligned with the respective mold press unit. The detector means is provided by three limit switches 113a, 113b, 113c which are actuated respectively by the respective parts a, b, c, of the actuator 111. The arrangement is such that when the carriage is in its aligned position with a selected press mold unit, each of the three limit switches is closed. When the carriage is moved to another mold press unit, for example, to the left as seen in FIG. 3, limit switches 113a, 113b are opened while 113c remains closed until it moves off the actuator 111. If the move of the carriage is to the right as seen in FIG. 3, limit switches 113c, 113b are opened while 113a remains temporarily closed. The limit switches are connected to a logic circuit 115 (housed in the cabinet 54) which translates the sequence in the opening of the limit switches 113a, 113c to a signal representative of the direction of movement. The limit switch 113b, as will be seen, will be opened and closed at each station thereby providing to the logic circuit, Binary Counter 115a and Present Position register 115b, a digital count of the number of mold press units from the start to the end of that particular movement. The selected next station of a particular move can be registered manually in the selected position count store 118 of the selector 117. When the number of mold press units between the first and final unit of the particular move has been counted, a signal from the register 115b is matched with the signal from the position store 118 to actuate a count coincidence unit 119 which acts to actuate a coincidence relay utilized to enable the injection sequence to occur at the selected station.

It will be readily apparent that detector means other than limit switches can be substituted and/or with other actuator means. For example, photocells can replace the limit switches 113a, 113b, 113c and cooperate either with light sources or with reflectors instead of the actuators 111.

The Binary Counter 115a, the Present Position register 115b, the Selected, and the Count Coincidence register are commercially available devices available from Cincinnati Milacron Inc., Cincinnati, Ohio, as "Boards" 3-531-3108A, 3-531-3099A, and 3-531-2517A.

The injection control means comprises an individual program control circuit 123 associated with each of the mold press units. The respective circuit 123 is energized in the station selector 117 in response to coincidence of the count reached in the Present Position register 115b and the selected Position store 118, by the count coincidence unit 119.

Each control circuit 123 includes a plurality of memory means each of which is manually presettable to control an injection parameter of the mold press unit associated with the particular circuit. Each of the several circuits 123 are identical, hence the description of one will suffice to describe the plurality thereof. Taking the control circuit 123 associated with the mold press unit at station 1, illustrated in FIG. 3, the memory means include: a pair of digital selector switches 125a and 125b which are operable, respectively, to select the time setting of the injection boost pressure and the injection hold pressure timers 126a, 126b; the digital selector switches 127a, 127b, which are operable to select appropriate combinations of the valves 128a, 128b, to provide selected speed ranges, respectively, for the forward travel rate of the screw when injecting material to the mold and the rotational speed of the injector screw while preparing material for injection into the mold. The respective speeds are subject to fine adjustment within the selected range by setting of the respective potentiometers 129a, 129b which control electromagnetic servovalves 130a, 130b. The memory means also include a potentiometer 131 which is manually presettable to control the volume of material delivered from the nozzle 31, that is, to control the "shot size" as will presently be described. Also, in the circuit 123 are the memory means 132a, 132b, potentiometers by which the electromagnetic servo-valves 133a, 133b are, respectively, adjusted to control the boost pressure and the overall pressure applied to the material during injection.

The digital selector switches, the potentiometers, and the timers, employed in the circuits 123 are commercially available devices which do not require further description here. It will be apparent from the foregoing description and from FIG. 3 that the circuits illustrated may be modified or expanded to suit particular requirements.

Inasmuch as a particular control circuit 123 associated with the selected mold press unit station is energized, as described hereinabove, in response to arrival of the injection means in alignment with the selected mold press unit, the program manually placed into the selected control circuit is activated. The injection process can be activated immediately and is completely independent of the programs preset for either the next preceding or the next succeeding mold press unit.

Figures 4, 5:
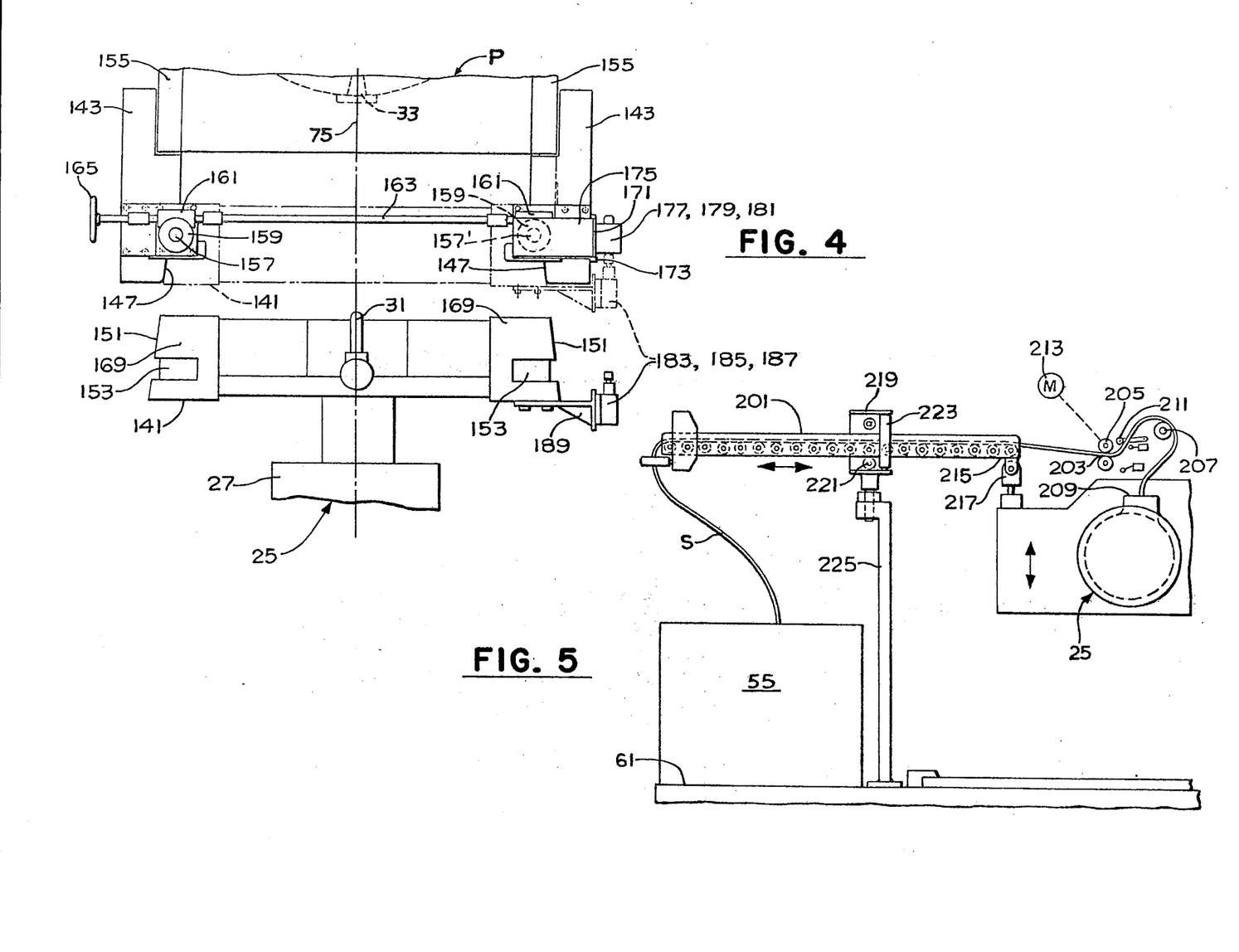
FIG. 4 is a plan view of a portion of the apparatus of FIG. 2, as indicated by line 4—4 of FIG. 2.
FIG. 5 is a partial elevation view of part of the apparatus of FIG. 1, taken as shown by 5—5 in FIG. 1.

Referring to FIGS. 2 and 4;

To secure the injector 25 with respect to the selected mold and mold press unit, the apparatus includes locking means provided by a locking bar frame 141 associated with the carriage and lock means comprising a pair of mold press unit adaptors 143 associated respectively with each mold press unit, the adaptors comprising the modifications previously referred to to the otherwise conventional mold press units P. The locking bar frame is carried on a pair of slide bars 145 which are accommodated slidably in slideways 145' forming a part of the platform 89. The arrangement permits the locking bar frame to move parallel to the injector barrel 27. The press frame adaptors are each provided with a planar vertical guide surface 147 each of which diverges outwardly of the mold press unit with respect to the surface 147 of the opposed adaptor. A vertically extending lock groove 149 is formed in each of the guide surfaces 147. The locking bar frame 141 has an opposed pair of plane vertical surfaces 151 which are respectively slidably engageable with the guide surfaces 147. A pair of retractable locking splines 153 are provided to retract and extend relative to the surfaces 151 of the locking bar frame to engage the respective lock grooves. The adaptors 143 are secured rigidly to the existing press side frames 155 to form an integral unit therewith.

A hydraulic cylinder 156 fixed on the platform 89 has its ram 158 attached to the locking bar frame 141 to move it toward and away from the selected unit P and relative to the platform.

When the locking frame surfaces 151 are in contact with the adaptor guide surfaces 147, alignment of the injector 25 with the vertical plane 75 is assured. In particular, the nozzle 31 and the sprue 33 are in vertical alignment. To align the nozzle and sprue at the same elevation, the elevator platform is raised, the locking frame surfaces sliding upward along the guide surfaces of the adaptors.

With respect to FIG. 4, to limit or determine the upward movement of the injector and particularly of the locking bar frame while engaged with the adaptors, an elevation stop means is provided in the form of a pair of threaded shafts 157, 157' extending vertically parallel to the guide surfaces 147. The shafts 157 are elevated by a pair of worm gears 159 each driven by a worm 161 which worms are connected by a cross shaft 163 rotatable by a hand wheel 165 to raise and lower the shafts 157. The ends of the shafts are engaged by the upward surface 169 of the locking bar frame at the upper limit of its rise as determined by the adjustment of the threaded shafts. Alternatively, only the one threaded shaft 157', its associated worm and worm wheel, can be used, relocating the hand wheel to suit.

When the injector nozzle 31 has been aligned, both in the vertical plane 75 and in a horizontal elevation plane, with the sprue 33, and the splines 153 extended into the grooves 149, a second slide operating means provided by the cylinder 156 acts to move the elevator 85 and the injector 25 toward the selected mold press unit P, overriding the cylinder 91. The particular feature and advantage of the arrangement is that all the force required to maintain the nozzle 31 in secure injection register with the mold sprue 33 is contained directly between the mold press unit and the injector by the locking bar frame and adaptor, completely isolating such forces from the other structure; namely, the floor 15, the carriage 20, and the elevator 85.

It is a notable feature of the apparatus that no conductive connection is required between the injection means and any of the mold press units of the apparatus. This has the advantage of avoiding electrical or fluid connections between each mold press unit and the injection means.

A vertical slide 171 is mounted on each pair of adaptors 143 by a fixture 173 in which the slide can move only vertically. The slide is attached to the threaded shaft 157' by an angle bracket 175 and moves up and down in exact timed relation with the threaded shaft. A solenoid 177, an actuator bar 179, and a switch 181, are mounted on the slide and are respectively cooperable with two switches 183, 185 and a solenoid 187 which are mounted on a bracket 189 fixed on the locking bar frame 141. The arrangement provides switch means for coordinating the injection means to the mold press unit when the locking bar frame is disposed to interlock in the adaptors of a selected mold press unit. The actuator bar 179 engages switch 185 closing a portion of the circuit enabling the forward movement of the injector, although not activating that movement. The solenoid 177 is connected in the mold press unit control circuit to be energized when that press is closed and under clamping pressure. Energization of the solenoid 177 actuates the switch 183 which closes a portion of a circuit enabling the injector to move forward to seat the nozzle in the selected sprue. The solenoid 187 is energized in response to completion of the injection hold pressure timer 130 to trip the switch 181 when injection is complete and the barrel can be moved away from the mold.

The switch 181 restores control of the mold press unit to its own (conventional) timing cycle. When the cure time is completed, the mold is opened normally for removal of the article.

The apparatus provides a further feature in that the supply of material travels with the injection means on the carriage 20. This permits the injector to operate at maximum efficiency. With reference to FIG. 5, the material supply means includes the container 55 carried on the deck 61 of the carriage 20. The container is loaded with elastomeric injectable compound in running length strip S by a plasticizing extruder (not shown) apart from the present apparatus, and is conveyed to and disposed on the carriage 20 by a fork truck or other loading means. The strip travels from the container over a roller conveyor 201 through the nip 203 of a pair of feed rolls 205 which pull the strip over the conveyor from the container. From the nip of the feed roll the strip travels about a fixed roll 207 and thence into the extruder inlet 209. Between the feed roll and the fixed roll, the strip is engaged by a dance roll 211 which monitors the extent of the slack in the strip and controls a hydraulic motor 213 driving the feed rolls to maintain a constant supply of strip at the injector inlet 209. The end 215 of the conveyor adjacent the feed roll is connected to the injector frame by swivel means provided by a mounting 217 hinged to the conveyor and rotatable relative to the frame 41 so that the end of the conveyor is raised and lowered, as well as moved forward or back, together with the injector. Intermediate the ends of the conveyor it is supported by support means in the form of a bracket 219 which has a horizontal roller 221 on which the conveyor is carried and a pair of rollers 223 which constrain the conveyor centrally of the bracket. The bracket 219 is carried rotatably on a post 225 which is fixed on and stands upright from the carriage deck 61. The arrangement permits the roller conveyor to move longitudinally of itself in the bracket as well as to swing both horizontally and vertically in response to the movements of the injector, without interrupting the feed of the strip to the injector.

The large movements of the injector 25 with respect to the carriage 20 and particularly with respect to the hydraulic power system 45 are accommodated in a notable way in the present apparatus.

Figure 6:
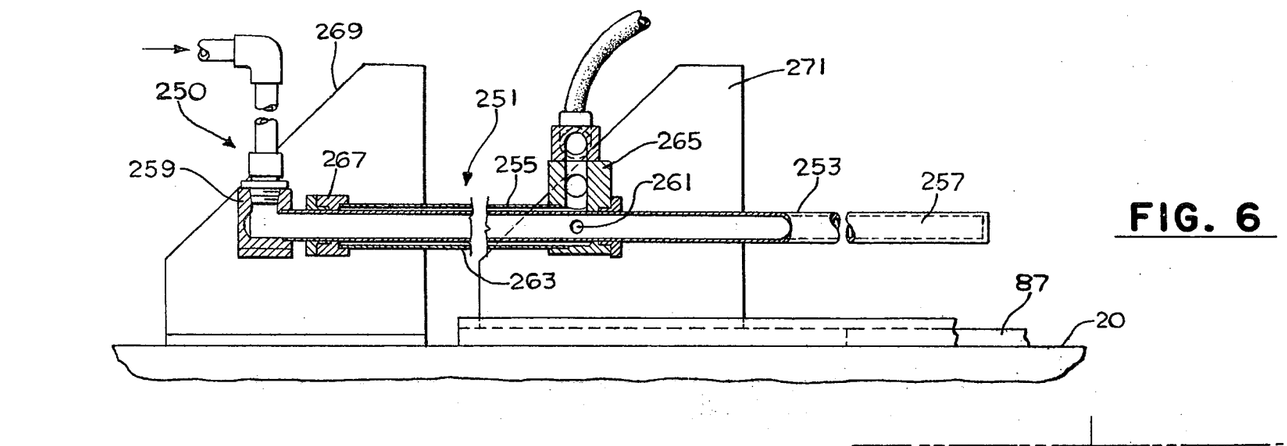
FIG. 6 is a view in elevation of a further part of the apparatus of FIG. 1 as indicated by 6—6 in FIG. 1.

To conduct hydraulic fluid between the power system 45, which is fixed on the carriage, and the extruder-injector 25, which is movable both horizontally and vertically relative to the carriage, the fluid conduits 250 each include slide transfer joints 251, FIG. 1, one of which is shown in more detail in FIG. 6. Each joint includes a portion fixed relative to the carriage and a sliding portion. The fixed portion 253 includes a hollow cylindrical tube 257 with a closed end and an open end secured in a fitting 259. At about its mid-length the tube has full flow ports 261 capable of passing fluid flow to and from the tube. The sliding portion 255 comprises a sleeve or tube 263 whose inside diameter is greater than the outside diameter of the tube 257 to provide a full flow, low pressure drop annular passage about equal in flow capacity to the tube 257. The sleeve 263 is about half the length of the tube 257 and surrounds the latter, extending between an end fitting 265 and a collar 267. The fitting 265 is slidingly sealed on the tube 257 between its closed end and the ports 261. The collar 267 is similarly slidably sealed on the tube between its fitting 259 and the ports 261.

The tube fitting 259 of each joint 251 is fixed on an upright mounting plate 269 secured to the carriage 20 with the respective tubes 257 extending parallel to the direction of movement of the slide base 87. The sleeve fittings 265 are each secured on an upright mounting plate 271 fixed on the slide base 87 so that the sleeve 263 moves with the slide base relative to the ports 261 in the tube, maintaining flow communication in each conduit over the entire travel of the injector 25.

Each sleeve fitting accommodates a flexible hose to conduct fluid to and from the injector. Two hose 273 serve the motor 35 and two hose 275 serve the respective ends of the cylinders 39, for the relatively lesser travel, vertically, of the injector.

The respective tube fittings 259 are connected conventionally for fluid flow to the hydraulic power system 45.

An important feature of the apparatus is the provision of precise control of the reciprocating movement of the screw and, therefore, of the amount of material moved through the nozzle into a mold. This is commonly referred to as the "shot size". The injection quantity control, FIG. 2, is provided by a rack 281 which is fixed by a bracket 283 on the injector yoke 37 and extends parallel to the barrel 27 through a guide 285 which also supports a pinion 287 rotatable about an axis fixed with respect to the injector frame 41. The teeth of the rack are in mesh with the teeth of the pinion so that movement of the injector yoke with respect to the injector frame produces an identical movement of the rack and a precisely related rotation of the pinion. A potentiometer 291 mounted on the frame 41 is rotated in timed relation with the pinion 287. The injection volume control means includes for each mold press unit P a control potentiometer 131 which can be manually set to produce a voltage corresponding with the desired shot volume. The potentiometer 291 and the selected control potentiometers 131 are connected by way of conventional circuit means operable to stop forward movement of the screw means 29 when a voltage of the control potentiometer is at zero difference with respect to the control potentiometer. The system has been demonstrated to be accurate to an extent that the amount of flash on a particular article, particularly the distance which such flash extends from the body of the article can be controlled within 0.05 inches.

Figure 7:
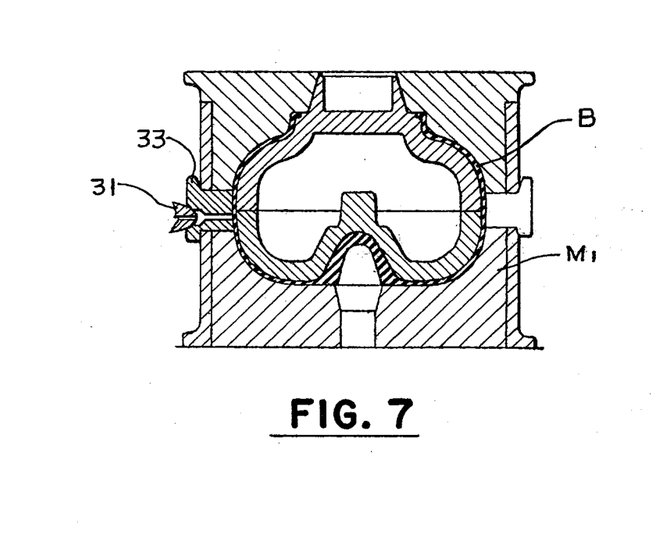
FIGS. 7 and 8 are representative cross-sections of molds which typically can be used in the mold press units according to the invention for the injection molding of, by way of example, the tire mold curing bladders.
Figure 8:
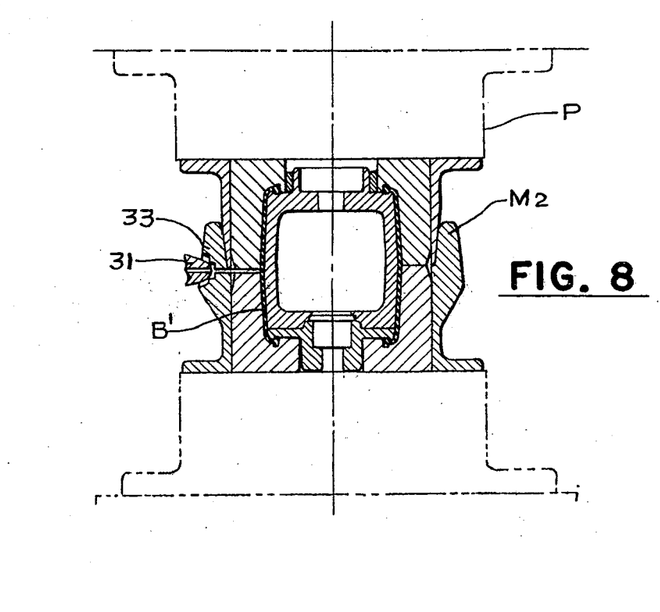

Referring now to FIGS. 7 and 8, the bladders B and B' are formed by injection molding and curing within the respective molds $M_1$ and $M_2$. As has been described hereinbefore, the nozzle 31 is placed in injecting relation with the mold sprue 33 so that forward movement of the injecting screw forces the injection molding material, preferably a butyl neoprene, into the cavity of the mold which conforms to the desired shape of the bladder B, FIG. 7, or in the case of FIG. 8, the bladder B'. It should be noted that in accordance with the description and the principles of the invention, the bladder B can be injection molded immediately after or immediately before the injection molding of the bladder B' in selectably ordered sequence with respect to each other or with respect to another article differing in size or shape from either.

Advantages provided by the invention relative to practices herebefore known and used include a marked reduction in the cure time required in an article molded in accordance with the invention. For example, a typical pg,21 bladder for tire mold press produced heretofore required 15 minutes of cure time in the mold cavity;

a bladder of the same material and dimensions produced in accordance with the invention requires 10 minutes of cure time in the mold cavity and attained as well improved uniformity of cure throughout its relatively thicker and thinner parts.

Injection molding of articles in accordance with the present invention is notably more economical than the previously practiced compression or cavity molding or transfer molding in that the manual preparation of discrete slugs or blanks is not required. Contamination of the material to be injected is very much reduced and the process in accordance with the invention allows the injectable material to be prepared on a very nearly continuous basis.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for injection molding a plurality of diverse articles in any selected sequence, the apparatus comprising a plurality of separate, independent, free-standing mold press units disposed in linear array, means independently connected to each mold press unit operable to control the cure-time cycle of such mold press unit independently of any other of said mold press units, a track having spaced parallel rails extending adjacent to each of said mold press units, a carriage movable along said track, injection means supported on said carriage for movement to injection registry with a mold in any selected one of said mold press units from any other of said units, means operable to move said injection means comprising hydraulic power generating means fixed on said carriage and connected to supply fluid power for operating said injection means, and elevator means disposed on the carriage and supporting said injection means, said elevator means being operable to raise and to lower said injection means rectilinearly relatively of the carriage, and adjustable elevation stop means disposed on each of said mold press units, abutment means carried on said elevator means cooperable with said stop means on the respectively selected mold press unit to terminate vertical upward movement of said injector means.

2. Apparatus as claimed in claim 1, including means operable to control movement of the carriage from a first mold press unit to a selected other mold press unit comprising actuator means in fixed relation respectively with each of said mold press units, and detector means on said carriage, the detector means being actuable by said actuator means to generate a first signal responsive to the direction of movement of said carriage from said first unit and a second signal responsive to the count of mold press units from said first to said other mold press unit.

3. Apparatus as claimed in claim 2, and injection control means including a plurality of memory means carried on said carriage and associated respectively with said mold press units, the memory means associated with a selected mold press unit being made operative to control said injection means in response to a signal generated by said detector means when actuated by the respectively associated actuator means.

4. Apparatus as claimed in claim 2, said carriage having wheels rollably engaging said rails, drive means mounted on the carriage and operable to move said carriage along said rails, brake means operable to brake rotation of said wheels, and carriage alignment means interconnected with said brake means so that while being deployed the alignment means can move the carriage free of restraint by the brake means.

5. Apparatus as claimed in claim 4, said alignment means comprising a tapered pin on the carriage and a correspondingly tapered socket respectively associated with each mold press unit.

6. Apparatus as claimed in claim 1, including injection control means comprising a plurality of memory means on said carriage each associated respectively with one of said press mold units, each said memory means comprising presettable control means respectively for controlling the rotation speed and the axial speed in said injection means, the time duratioin of injection by the injection means, and the pressure in said injection means, the memory means associated with a selected one of said press mold units being energized in response to alignment of the injection means and said selected one press mold unit.

7. Apparatus as claimed in claim 1, said elevator means comprising a slide base secured slidably for horizontal movement on the carriage, platform means having said injection means mounted thereon, and jack means operable to move the platform means vertically relative to the slide base to match the sprue elevation and the injector nozzle elevation.

8. Apparatus as claimed in claim 7, and second slide operating means mounted on said platform means and connected to said locking means, said second slide operating means being operable, when said locking means connects to lock means of a selected mold press unit, to move said slide base and the injection means to extrudate-injecting relation with a mold in said selected mold press unit.

9. Apparatus as claimed in claim 8, said first slide operating means being an hydraulic cylinder connected between said carriage and the slide base of the elevating means, said second slide operating means being an hydraulic cylinder fixed on said platform and having a ram attached to said locking means.

10. Apparatus as claimed in claim 8, said locking means being mounted slidably on said platform.

11. Apparatus as claimed in claim 7, said jack means comprising a plurality of screwjacks, jack drive means connecting the plurality of screwjacks for equal vertical movements, a plurality of guide pins fixed to and extending upwardly from said slide base and a plurality of guide pin bushings fixed to said platform, said bushings being slidable along said pins.

12. Apparatus as claimed in claim 1, further comprising means operable to feed a continuous running length strip of elastomeric compound from a supply thereof to said injection means the latter being movable relative to said supply, comprising, mounted on said carriage, a container, a roller for carrying strip pulled thereover to said injection means, a first support having a roller supporting the conveyor intermediate of its ends, a second support attached to said injection means for movement up and down, forward and back therewith and connected to one of the ends of the conveyor to move the so connected end with the injection means and to move the conveyor longitudinally of itself across said roller as well as angularly thereabout in response to movement of the injection means relative of said carriage.

13. Apparatus as claimed in claim 1, comprising lock means including an opposed pair of press frame adapters fixed respectively on the side frames of each of said mold press units, each of said adapters having a planar vertical guide surface diverging outwardly of the mold press unit and a vertically extending lock groove, locking means on said injection means having an opposed pair of planar vertical surfaces respectively slidably engageable with said guide surfaces of the lock means of any selected mold press unit and having a pair of vertically extending locking splines cooperable with the respectively associated pair of each grooves, said lock means and locking means being cooperable independently of the elevation of the injection means relatively of the carriage to connect the injection means and any selected one of the mold press units, and disengageable to allow free movement of the injection means away from said one mold press unit.

14. Apparatus for injection molding, comprising a carriage movable along a linear track, elevator means on said carriage and movable horizontally normal to said track, injection means disposed on the elevator means, the elevator means being operable to raise and to lower the injection means relative to the carriage, a plurality of separate individually free-standing mold press units arranged along said track, each having independently controlled cure time cycle, a mold for curing an injection molded article disposed in each of said press mold units, at least one mold differing from others thereof at least in elevation measured at the mold sprue, lock means fixed respectively on each mold press unit and locking means carried on said carriage, said lock means and said locking means being cooperable to connect rigidly said injection means and a respectively selected one of said press mold units independently of the elevation of the injection means, and to disconnect same to allow free movement of said carriage along said track, said mold press units being in a linear array, and said track means comprising a pair of rails extending parallel to said array, means for controlling movement of the carriage from a first mold press unit to a selected other mold press unit comprising actuator means in fixed relation respectively with each of said mold press units and detector means on said carriage, the detector means being actuable by said actuator means at any one of said mold press units to generate a first signal respective to the direction of movement of said carriage and a second signal responsive to the count of mold press units from said first to said other mold press unit, a plurality of memory devices carried on said carriage for association respectively with said mold press units, the memory devices associated with a selected mold press unit being made operative to control said injection means in response to signals generated by said detector means when actuated by the respectively associated actuator means, said lock means comprising an opposed pair of press frame adapters fixed respectively on the side frames of each of said mold press units, each of said adapters having a planar vertical guide surface diverging outward of the press mold unit with respect to the surface of the opposed adapter and a vertically extending lock groove, said locking means including a frame having an opposed pair of planar vertical surfaces respectively slidably engageable with the guide surfaces and a pair of retractable locking splines extendable to enter the respectively associated lock grooves, and injection means to mold press unit coordinating means comprising switch means and switch actuating means fixed respectively on each mold press unit and on said locking frame, said switch actuating means being operable to actuate said switch means when said locking means is disposed for locking between said press frame adapters of the selected mold press unit, said switch means when actuated acting to interlock control of mold press unit operating cycle and control of injection means operating cycle without conductive connection therebetween.

15. Apparatus for injection molding articles of an injectable curable elastomeric compound, the apparatus including a plurality of independent free-standing mold press units and a single injection means selectively associable with individual ones of said mold press units, and characterized by lock means affixed individually on each of said mold press units and locking means on said injection means, said locking means being interengageable with said lock means of a selected mold press unit to resist forces tending to separate the injection means from the mold press unit during injection of said compound into the mold press unit and to isolate said forces from structures supporting the mold press unit, said lock means comprising a pair of adapters fixed respectively on the mold press units, each pair of adapters having respectively opposed plane vertical guide surfaces diverging outwardly of the associated press mold units, said locking means comprising a frame having an opposed pair of plane surfaces converging outwardly of said injection means and slidably engageable with said guide surfaces, said frame being mounted for movement between the injection means and a respective selected mold press unit, and elevator stop means mounted on each press mold unit for locating said locking means vertically with respect to said adapters.

* * * * *